United States Patent
Tonack et al.

(10) Patent No.: US 7,133,804 B2
(45) Date of Patent: Nov. 7, 2006

(54) MAINTENANCE REQUEST SYSTEMS AND METHODS

(75) Inventors: Mark Tonack, Omaha, NE (US); Henry M. Abelman, Roswell, GA (US); Kenneth Algiene, Littleton, CO (US)

(73) Assignee: First Data Corporatino, Greenwood Village, CO (US)

( * ) Notice: Subject to any disclaimer, the term of this patent is extended or adjusted under 35 U.S.C. 154(b) by 434 days.

(21) Appl. No.: 10/322,310

(22) Filed: Dec. 17, 2002

(65) Prior Publication Data

US 2003/0163489 A1    Aug. 28, 2003

Related U.S. Application Data

(63) Continuation-in-part of application No. 10/081,167, filed on Feb. 22, 2002.

(51) Int. Cl.
    *G06F 19/00*    (2006.01)
(52) U.S. Cl. .................. 702/184; 702/182; 702/183
(58) Field of Classification Search ............. 702/182, 702/183, 184, 185; 701/29, 30; 340/870.01, 340/901, 988, 425.5, 500, 679; 700/108
    See application file for complete search history.

(56) References Cited

U.S. PATENT DOCUMENTS

| | | | |
|---|---|---|---|
| 5,355,083 A * | 10/1994 | George et al. ............ 324/229 |
| 5,463,768 A | 10/1995 | Cuddihy et al. |
| 5,541,510 A * | 7/1996 | Danielson .................. 324/233 |
| 5,666,481 A | 9/1997 | Lewis |
| 5,963,911 A | 10/1999 | Walker et al. |
| 6,032,184 A | 2/2000 | Cogger et al. |
| 6,118,936 A | 9/2000 | Lauer et al. |
| 6,192,325 B1 * | 2/2001 | Piety et al. ................ 702/184 |
| 6,219,648 B1 | 4/2001 | Jones et al. |
| 6,385,497 B1 | 5/2002 | Ogushi et al. |
| 6,415,392 B1 | 7/2002 | Suzuki et al. |
| 6,445,774 B1 | 9/2002 | Kidder et al. |
| 6,601,190 B1 | 7/2003 | Meyer et al. |
| 6,609,051 B1 * | 8/2003 | Fiechter et al. ............. 701/33 |
| 6,622,264 B1 * | 9/2003 | Bliley et al. ............... 714/26 |
| 6,636,771 B1 * | 10/2003 | Varma et al. .............. 700/79 |
| 6,643,801 B1 * | 11/2003 | Jammu et al. ............. 714/37 |
| 6,658,586 B1 | 12/2003 | Levi |
| 6,691,064 B1 * | 2/2004 | Vroman ..................... 702/183 |
| 6,732,027 B1 * | 5/2004 | Betters et al. .............. 701/29 |
| 6,738,748 B1 * | 5/2004 | Wetzer ..................... 705/9 |
| 6,745,151 B1 * | 6/2004 | Marko et al. .............. 702/182 |
| 6,748,294 B1 | 6/2004 | Overman et al. |
| 6,795,935 B1 * | 9/2004 | Unkle et al. ............... 714/37 |
| 6,804,589 B1 * | 10/2004 | Foxford et al. ............ 701/29 |

(Continued)

*Primary Examiner*—Patrick J. Assouad
(74) *Attorney, Agent, or Firm*—Townsend and Townsend and Crew LLP (57) ABSTRACT

A method for requesting one or more machines to be maintained includes monitoring the machine or machines and detecting when a failure of at least one machine occurs. The method further includes executing a computer program on an electronic terminal associated with the failed machine. The method further includes entering data relating to the condition of the failed machine into the computer program via the electronic terminal and transmitting the data to a database server, thereby initiating a process to alter the condition of the failed machine. In one embodiment of the method, the database server compiles historical data relating to the condition of the one or more machines. The historical information may be used in a predictive maintenance environment to further minimize downtime.

14 Claims, 8 Drawing Sheets

U.S. PATENT DOCUMENTS

| | | | |
|---|---|---|---|
| 6,816,815 B1* | 11/2004 | Takayama | 702/184 |
| 6,836,749 B1* | 12/2004 | Sampson | 702/184 |
| 6,871,160 B1* | 3/2005 | Jaw | 702/182 |
| 6,898,469 B1* | 5/2005 | Bickford | 700/30 |
| 6,947,797 B1* | 9/2005 | Dean et al. | 700/79 |
| 6,959,235 B1* | 10/2005 | Abdel-Malek et al. | 701/33 |
| 6,988,011 B1* | 1/2006 | Varma et al. | 700/79 |
| 7,051,044 B1* | 5/2006 | Fera et al. | 707/104.1 |
| 2002/0032505 A1* | 3/2002 | Good | 701/29 |
| 2002/0032511 A1* | 3/2002 | Murakami et al. | 701/50 |
| 2002/0035495 A1* | 3/2002 | Spira et al. | 705/7 |
| 2002/0113877 A1* | 8/2002 | Welch | 348/148 |
| 2002/0143421 A1* | 10/2002 | Wetzer | 700/100 |
| 2002/0143443 A1* | 10/2002 | Betters et al. | 701/29 |
| 2002/0184178 A1* | 12/2002 | Tasooji et al. | 706/50 |
| 2002/0198997 A1* | 12/2002 | Linthicum et al. | 709/227 |
| 2003/0004624 A1* | 1/2003 | Wilson et al. | 701/33 |
| 2003/0046382 A1* | 3/2003 | Nick | 709/224 |
| 2003/0069648 A1* | 4/2003 | Douglas et al. | 700/2 |
| 2003/0069848 A1 | 4/2003 | Douglas et al. | |
| 2003/0115019 A1* | 6/2003 | Doddek et al. | 702/183 |
| 2003/0128991 A1* | 7/2003 | Carling et al. | 399/8 |
| 2003/0128997 A1 | 7/2003 | Carling et al. | |
| 2003/0163440 A1 | 8/2003 | Tonack | |
| 2003/0163489 A1 | 8/2003 | Tonack | |
| 2003/0195678 A1* | 10/2003 | Betters et al. | 701/29 |
| 2003/0216976 A1* | 11/2003 | Ehrman et al. | 705/28 |
| 2004/0024502 A1* | 2/2004 | Squires et al. | 701/33 |
| 2004/0039502 A1* | 2/2004 | Wilson et al. | 701/29 |
| 2004/0073468 A1* | 4/2004 | Vyas et al. | 705/8 |
| 2004/0090346 A1* | 5/2004 | Simonds et al. | 340/905 |
| 2004/0093102 A1 | 5/2004 | Lirri et al. | |
| 2004/0181368 A1 | 9/2004 | Breunissen et al. | |
| 2004/0199361 A1 | 10/2004 | Lu et al. | |
| 2004/0204805 A1* | 10/2004 | Betters et al. | 701/35 |
| 2004/0254764 A1* | 12/2004 | Wetzer et al. | 702/184 |
| 2005/0090951 A1* | 4/2005 | Good | 701/29 |
| 2005/0096810 A1* | 5/2005 | Mahoney et al. | 701/29 |
| 2005/0143956 A1* | 6/2005 | Long et al. | 702/184 |
| 2005/0197727 A1 | 9/2005 | Ogushi et al. | |
| 2005/0222813 A1 | 10/2005 | Bjornson | |

* cited by examiner

MAINTENANCE REQUEST SYSTEMS AND METHODS

CROSS-REFERENCE TO RELATED APPLICATIONS

This application is a Continuation-in-Part of co-pending, commonly assigned U.S. patent application Ser. No. 10/081,167, filed on Feb. 22, 2002,by Mark Tonack, which application is incorporated herein by reference in its entirety for all purposes.

BACKGROUND OF THE INVENTION

This invention relates generally to equipment maintenance systems and more particularly to systems and methods for coordinating and accomplishing the maintenance of equipment distributed throughout a number of remote locations. In some embodiments, historical maintenance data is used to predict future maintenance requirements.

In some fields production equipment is used in high volume, low cost per unit applications. However, the cost per unit quickly increases if the equipment is out of service for an extended period of time. For example, when a piece of production equipment is out of service for maintenance or repair, the work intended to be processed on the equipment must be suspended or routed to a different machine. In either case, potentially high cost equipment is being underutilized, and the cost per unit of work processed by the equipment increases.

It would not be cost effective to maintain skilled labor at the location of each such piece of production equipment. Repair technicians, for example, are not required at a production site during the entire time the equipment is being used for production. However, when the services of the repair technician become necessary due to an equipment failure, it becomes essential to keeping the equipment fully utilized to alert the technician and initiate the repair process. The repair process is further expedited by more specifically informing the repair technician of the condition of the machine.

Therefore, the need exists for systems and methods to monitor and maintain production equipment used in a decentralized production environment. The system should alert maintenance personnel as to the condition of the equipment, thereby expediting the maintenance process. A further objective of such a system is to compile information relating to the repair and service history of equipment within the system and use the information to predict future maintenance requirements.

BRIEF SUMMARY OF THE INVENTION

In one embodiment a method is provided for requesting one or more machines to be maintained. The method includes monitoring the machine or machines to detect that a failure of at least one machine has occurred. A computer program is executed on an electronic terminal associated with the failed machine and data is entered relating to the condition of the failed machine. The data is transmitted to a database server, thereby initiating a process to alter the condition of the failed machine. This is advantageous because maintenance information is compiled at a central location and may be accessed from many different remote locations. In one aspect of the invention, the method also includes compiling historical data relating to the condition of the one or more machines using the database server. In another aspect of the invention, the machine or machines includes mail processing equipment. In another example, the method further includes transmitting the data to an email server, thereby initiating a process to transmit an alert to a maintenance technician. The alert could include an electronic message to a personal pager. The alert could also include an electronic mail message.

In another aspect of the invention, the electronic terminal includes a monitor and the method includes displaying screen displays having data fields. One of the data fields can include a drop-down menu having a plurality of codes relating to potential conditions of the one or more machines, in which case the method could include selecting a code from the drop-down menu relating to the condition of the one or more machines. Another of the data fields could include a text area for entering operator notes, in which case the method could include entering operator notes into the text area for entering operator notes. The screen display could include one or more electronic buttons for use with a pointing device to initiate certain operations, in which case the method could include entering data with the pointing device and selecting an electronic button, thereby initiating transmitting the data to the database server. Another of the data fields could include a drop-down menu having a plurality of codes relating to potential repair activities required due to the failure of the machine, in which case the method could include selecting a code from the drop-down menu relating to a repair activity required due to the failure of the machine. Another of the data fields could include a text area for entering information relating to the amount of time required to repair the machine, in which case the method could include entering data relating to the amount of time required to repair the machine. Another one of the data fields could include a text area for displaying information relating to the amount of time a repair technician spends taking breaks while altering the condition of the failed machine, in which case the method could include entering information relating to the amount of time spent taking breaks.

In another embodiment, the invention includes a system for coordinating the maintenance of various machines at one or more remote locations. The system includes a database server and a communications connection that provides electronic access to one or more remote locations, including the remote locations were the various machines are located. The database server is configured to receive information from each of the one or more remote locations relating to the condition of the machine or machines at the location. The database server is further configured to cause the information to be stored electronically such that the information may be later analyzed. The database server is further configured such that upon receipt of a request, the database server transmits an alert to a different remote location, thereby initiating a process to alter the condition of the machine. In one aspect of the embodiment, the machine includes mail processing equipment.

In another embodiment, the invention includes a device for requesting one or more machines to be maintained. The device includes a computer having a central processor. The device also includes a monitor that graphically displays a user interface having various elements wherein at least a first of the various elements includes a drop-down menu having a plurality of codes relating to potential conditions of the one or more machines. The device also includes a data entry system that responds to commands to enter data into various ones of the elements. The device also includes a communications arrangement for electronically interfacing to a central location. The central location is configured to electronically access one or more remote locations, including the location were the one or more machines to be maintained is/are located. The central location is also configured to receive information from each of the one or more remote locations relating to the condition of a machine or machines at the location. The central location is also configured to store the information electronically such that the information may be later analyzed. The central location is further configured such that upon receipt of a request, the central location causes an alert to be transmitted to a different remote location, thereby initiating a process to alter the condition of the machine. In one aspect of the device, the machine or machines includes mail processing equipment.

In one example of the device, another of the various elements could include a text area for entering operator notes. Yet another one of the various elements could include one or more electronic buttons for use with the pointing device to initiate certain operations. Another one of the various elements could include a drop-down menu having a plurality of codes relating to potential repair activities. Another one of the various elements could include a text area for entering information relating to the amount of time spent in maintaining a machine.

In another embodiment of the invention, a system for coordinating the maintenance of various machines at different locations is provided. The system includes at least one machine, the maintenance of which is to be coordinated. The system also includes a controller associated with the machine. The controller includes a monitor and a data input device. The controller is configured to receive data relating to the condition of the machine. The controller is further configured to transmit the data to at least a second location. The system also includes a database server and a communications connection that provides electronic access to other locations. The database server is configured to receive information from the controller relating to the condition of the machine or machines. The database server is configured to store the information electronically such that the information may be later analyzed. The database server is further configured such that upon receipt of a request, the database server transmits an alert to another location, thereby initiating a process to alter the condition of the machine. The system also includes a remote computer configured to receive the alert. The remote computer is further configured to relay the content of the alert to a maintenance technician.

In one aspect of the system, at least one machine includes mail processing equipment. In one example of the system, the remote computer comprises a pager. The content of the alert could be relayed to the maintenance technician via an electronic email.

In another embodiment of the invention, a system for coordinating the maintenance of one or more machines is provided. The system includes first means for monitoring the one or more machines. The system further includes second means for detecting that a failure of at least one machine has occurred. The system also includes third means for compiling a message containing information relating to the condition of the failed machine. The system further includes fourth means for causing the message to be transmitted to a remote location. The remote location is configured to receive and process the message, and depending on the content thereof, transmit an alert to a different location, thereby initiating a service call to a maintenance technician.

In some embodiments of the present invention, the historical maintenance data is used for a number of useful purposes. For example, the historical maintenance data may be used to suggest potential corrective measures to enable a machine operator to attempt to cure the failed condition of the machine. The suggested measures might include a graphical representation of the machine indicating the physical location for the operator to apply the corrective measures. The historical maintenance data also might be used to calculate predictive maintenance metrics. Such metrics might include: mean time between failures; mean time to repair; availability; and the like. Some metrics may be calculated at the part level and/or the machine level. The metrics may be used to adjust inventory levels, schedule preventative maintenance, and the like. In some embodiments, the metrics are calculated based on cycle time of the machine, while in other embodiments, the metrics might be calculated based on calendar time. In yet other embodiments, the historical data may be used to determine if particular machine operators or repair technicians are associated with recurring problems. This information then may be used to schedule training, determine specialization needs, and the like.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

The present invention is described in conjunction with the appended figures.

DETAILED DESCRIPTION OF THE INVENTION

The present invention provides a system for coordinating and accomplishing the maintenance and repair of production equipment in a decentralized or distributed system. In such systems, especially systems wherein a common type of production equipment is found throughout the system, it is often the case that maintenance and/or repair personnel are not collocated with the equipment. Therefore, a system such as that described herein increases the utilization of the production equipment by providing an informed, rapid response capability to maintenance and repair issues. Additionally, in one embodiment of the present invention, maintenance and repair activities are recorded and stored for later analysis. This information may be used in a predictive maintenance process to further increase the utilization of the production equipment.

Figure 1:
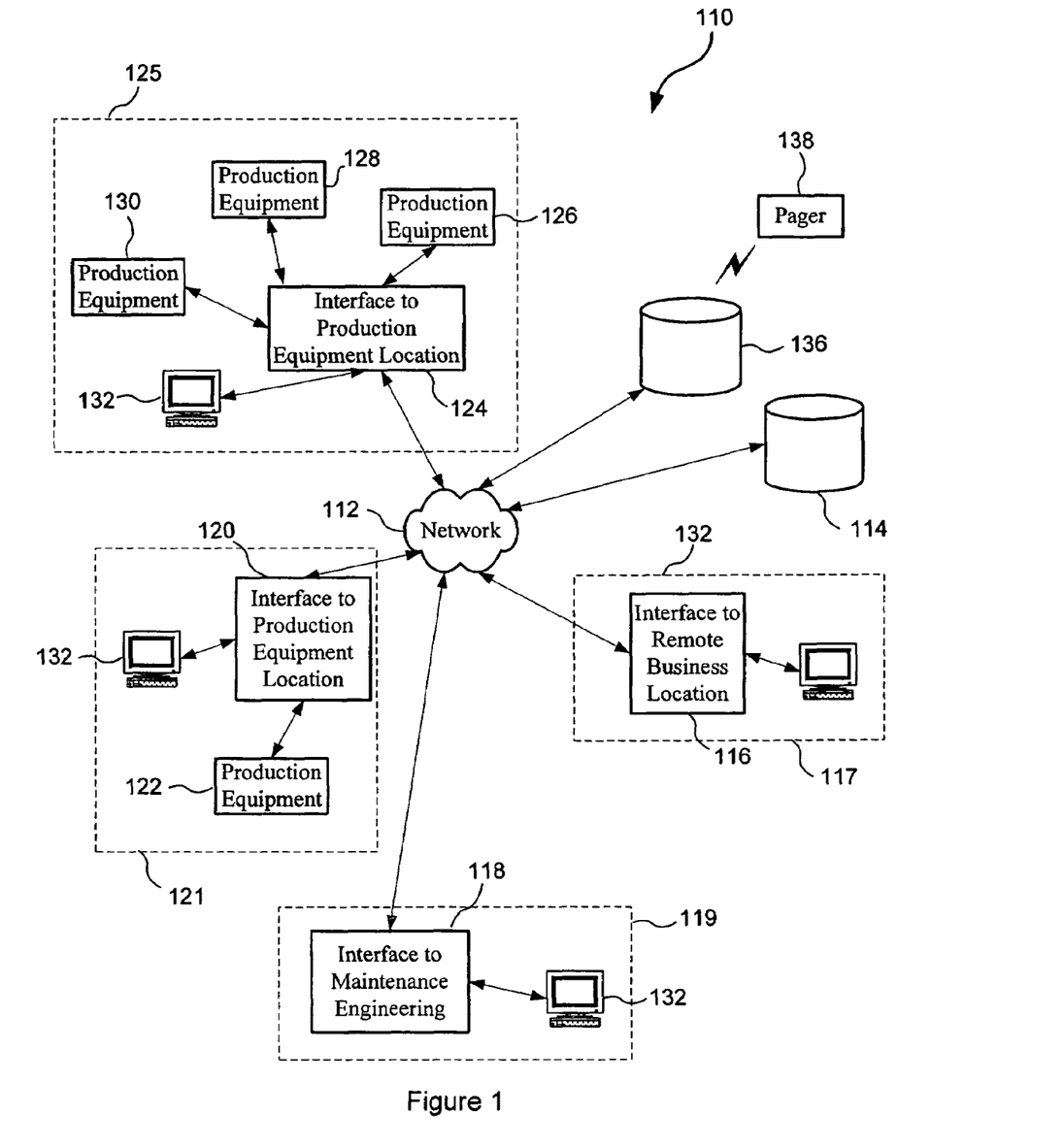
FIG. 1 is a schematic diagram of a decentralized, networked production environment according to one embodiment of the present invention.

Attention is first directed to FIG. 1, which illustrates a typical networked production environment. The networked production environment 110 of FIG. 1 includes a network 112, a database server 114 and a number of interfaces between the network 112 and remote locations. The interfaces include an interface 116 to a remote business location 117 and an interface 118 to a maintenance engineering location 119. The interfaces also include an interface 120 to a first production equipment location 121, the first production equipment location 121 being one having only a single piece of production equipment 122. The interfaces also include an interface 124 to a second production equipment location 125, the second production equipment location 125 being one having multiple pieces of production equipment 126, 128 and 130.

The database server 114 could take many forms, as is know in the art. For example, the database server 114 could be one or more magnetic storage devices, such as disk drives or tape drives, one or more optical storage devices, such as CDRWs or DVDs, solid state memory and the like or any combination of the foregoing.

No inference should be drawn related to the size of the networked production environment 110 illustrated or the relative locations of the items connected by the network. The networked production environment 110 may be distributed internationally or may be enclosed within a single plant or facility. Further, the networked production environment 110 may take may forms other that the hub-and-spokes arrangement illustrated in FIG. 1, and the network 112 may be, for example, an intranet, the internet, a local area network (LAN) or a wide area network (WAN). Further still, the interfaces 116, 118, 120 and 124 may take many forms known to those having skill in the art. A number of commercially available modems, routers and other network hardware would satisfy the requirements for the interfaces 116, 118, 120 and 124 and the other components of the network 112.

Although the production equipment 122, 126, 128 and 130 is shown as being connected to the network, this is not required. The production equipment may be stand alone equipment or may be connected to the network as shown and receive information and/or commands directly from computers connected to the network. Also, the present invention is not limited to coordinating the maintenance of production equipment at the machine level, but may also be used to coordinate the maintenance of items at the component level that make up the production equipment.

Terminals 132 are located at each equipment or remote business location 117, 121, 125, as well as the maintenance engineering location 119. The terminals 132 may take many forms such as for example, computer terminals, personal computers, workstations, or other data entry devices, as is known to those having skill in the art.

Now that the general arrangement of the network production environment 110 has been described, a more detailed description will be provided. Equipment operators typically are located at each production equipment location 125, 121. The equipment operators supervise the production activity carried out on the production equipment 120, 126, 128, 130. Typically, the equipment operators are not skilled in the maintenance or repair of the production equipment; therefore, it becomes necessary to have repair and maintenance technicians available to respond to equipment breakdowns.

According to one embodiment of the present invention, maintenance and repair technicians are located at the maintenance engineering location 119, which may be some distance from the production equipment locations 121, 125. The terminal 132 located at the maintenance engineering location 119 is configured to periodically request information from the database server 114, as will be described. In fact, any of the terminals in the system 110 may be so configured.

The system also includes an e-mail server 136 connected to the network 112. The email server 136 is configured to send emails throughout the system 110. The email server 136 is also configured to transmit electronic messages to personal pagers 138. Personal pagers 138 may include cell phones, standard pagers, PDAs and the like.

Employees or supervisors located at remote business locations such as the remote business location 117 are able to access information relating to the maintenance and repair status of the production equipment 122, 126, 128, 130 via the network 112.

Figure 2:
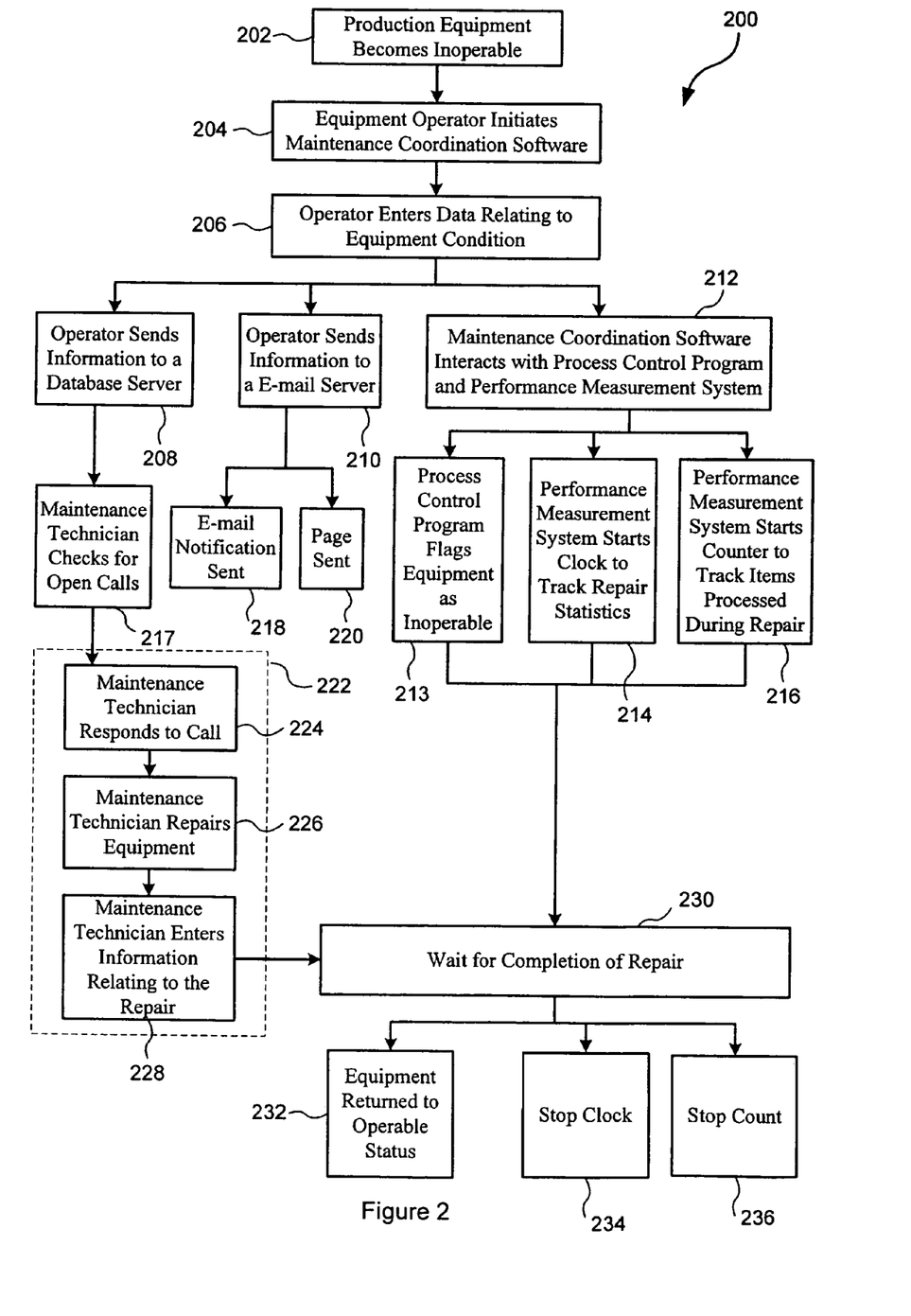
FIG. 2 is a flow diagram of a maintenance coordination system that may be implemented in the networked production environment of FIG. 1.

Attention is now directed to FIG. 2, which illustrates a process 200, for coordinating the maintenance or repair of production equipment according to one embodiment of the present invention. The process 200 begins at step 202 when production equipment becomes inoperable. The equipment operator recognizes the inoperable condition of the production equipment and initiates the maintenance coordination software on a terminal. This may be any terminal associated with the networked production environment, such as a terminal located in the production equipment location or even a terminal integral with the failed production equipment.

Figure 3:
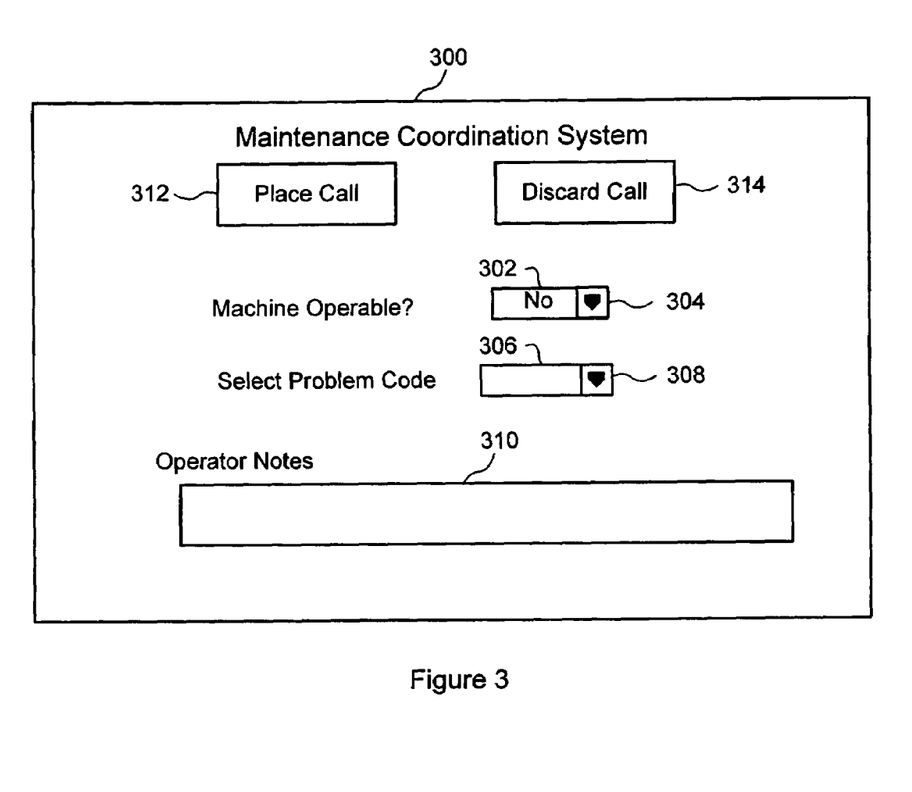
FIG. 3 is a first screen display that may be used in the maintenance coordination system of FIG. 2.

Attention is now directed to FIG. 3 in combination with FIG. 2. When the equipment operator initiates the maintenance coordination software at step 204, a screen display similar to the screen display 300 illustrated in FIG. 3 appears on the terminal display screen. At step 206, the operator enters data relating to the equipment condition into data fields on the screen display 300. The screen display 300 may contain a number of data fields such as, for example, a "Machine Operable?" data field 302 to indicate the operable condition of the machine. The data field 302 could include a drop down menu 304 for selecting among a finite set of codes or responses such as, for example, "Yes" or "No" in response to "Machine Operable?". A similar arrangement could be used for "Select Problem Code" data field 306 to select particular problem codes from a drop down menu 308. The problem codes listed may include those associated with the inoperable condition of the equipment. The screen display 300 could also include an "Operator Notes" text field 310 wherein the equipment operator may enter notes relating to the inoperable condition of the equipment, thus further expanding on the particular problem code selected. The operator may use standard data entry equipment such as a keyboard and mouse to complete the data entry operation of step 206.

The screen display 300 could also include electronic buttons such as the "Place Call" button 312 and the "Discard Call" button 314. The equipment operator could use a pointing device such as a mouse to point to and select the appropriate button at step 208 to send the information to the database server 114.

Selecting the "Place Call" button 312 also initiates sending information relating to the service call to the email server 136, as indicated by operation 210. It further causes the maintenance coordination software to coordinate with other software applications, namely, a process control program and a performance measurement system, as indicated at operation 212. The process control program halts any production job that might be in progress at the time the maintenance call is placed by flagging the production equipment as inoperable (operation 213). The performance measurement system initiates actions to track statistics relating to the amount of time required to respond to the call and to repair the machine (operation 214). The performance measurement system also keeps track of the items processed by the production equipment while the machine is inoperable.

In some embodiments, rather than sending the information to an email server, selecting the Place Call button 312 results in a potential corrective measure being returned by the database server 114. The suggested corrective measure may be based on historical information, as will be described below. In some examples according to these embodiments, the suggested corrective measure may include graphical representations of the inoperable machine indicating the physical location where the operator should apply the suggested corrective measure. Thus, historical data may be used to reduce the need for maintenance technicians to respond to every service call. Of course, if the suggested correction fails to cure the problem, then the operator may select a button that continues the process of alerting a repair technician.

Flagging the production equipment as inoperable at operation 213 is helpful to ensuring a smooth flow of work in the production environment. For example in networked production environments that produce or process items for customers, an equipment failure may cause a delay in completing a customer's work. By issuing a stop work command to the affected areas, the entity responsible for scheduling and routing customer jobs will avoid sending work to the affected areas until the equipment is repaired.

Tracking the time to repair by starting the clock at operation 214 is helpful for a number of reasons. First, maintenance and repair technicians can better prioritize their response to service calls if they are experiencing multiple, simultaneous failures. Second, by analyzing historical data collected over a period of time, maintenance supervisors can more efficiently organize the maintenance system by, for example, better allocating maintenance resources to production areas that experience long waits for repair. Additionally, if production equipment is used for customer work, and cost to customers is a function of time, then tracking the time to repair could be necessary to ensuring that a customer is not charged for the repair time.

Tracking the number of items processed during the repair process at operation 216 is also important to ensuring customers are charged properly, especially when customers are charged on a per unit processed basis. Maintenance and repair technicians may need to test the repaired equipment to make sure it is operating properly. Any items processed during testing may need to be subtracted from the total batch processed for the customer whose order was in production at the time the equipment became inoperable.

At operation 217, maintenance technicians check for open service calls. Checking for open calls may be accomplished in a number of different ways. For example, a terminal, such as the terminal 132 at the maintenance engineering location 119, may be configured to automatically check for open calls periodically by requesting the database server 114 to transmit the open call list. The request may include an instruction to list only maintenance calls in a particular location or relating to a particular type of production equipment. Thus, maintenance technicians may focus their attention on production equipment only within their areas of responsibility. Alternatively, any terminal within the network that includes the maintenance coordination software may be used to transmit a similar request to the database server 114. Thus, a maintenance technician on a service call at a production equipment location may use the terminal associated with the production equipment to check the open call list.

Alternatively, maintenance technicians may be altered to an open maintenance request by email or pager (operations 218 and 220, respectively). The email server 136 may be configured to send pages or email, as directed by the service call, to anyone in the network, including maintenance technicians or area supervisors, for example.

Receipt of a maintenance call by a maintenance and repair technician initiates a repair process 222 that will be explained in more detail hereinafter. Briefly, however, the repair process 222 includes: responding to the call at step 224; repairing the equipment at step 226; and entering information relating to the repair and transmitting the information to the database server at step 228. At step 230, the process control program and the performance measurement system receive the notification that the repairs have been completed and respond to any steps that were suspended awaiting completion of the repairs. For example, the process control program returns the equipment to operable status at step 232. At step 234, the performance measurement system stops the clock that was initiated at step 214 to track the time to repair. At step 236, the performance measurement system stops the counter that was initiated at step 216.

Figure 4:
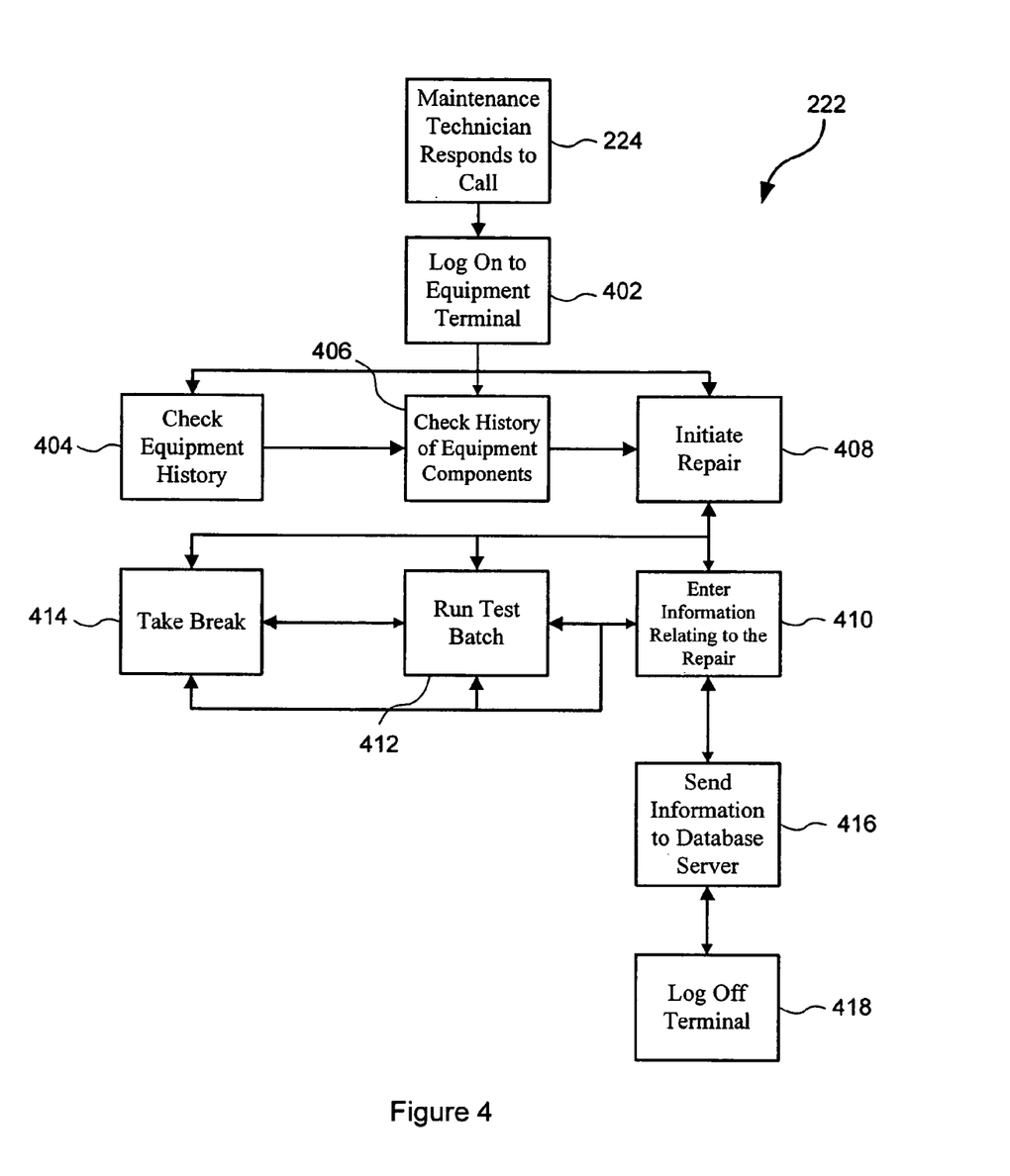
FIG. 4 is a flow diagram of a portion of the maintenance coordination system of FIG. 2 in greater detail.
Figure 5:
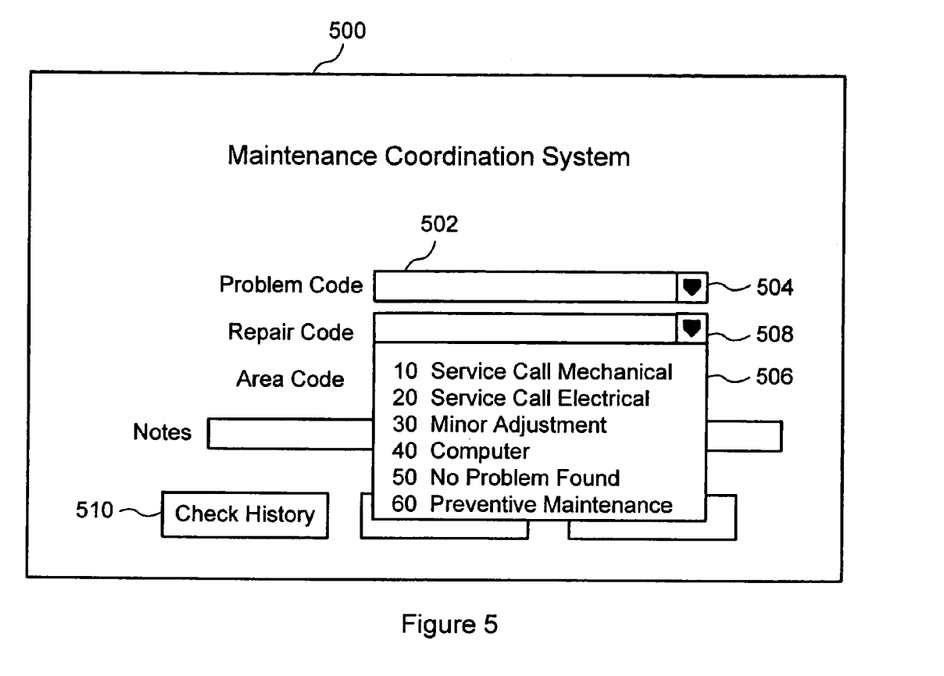
FIG. 5 is a second screen display that may be used in the maintenance coordination system of FIG. 2.

Attention is now directed to FIG. 4 in combination with FIG. 5. FIG. 4 illustrates the repair process 222 in greater detail. FIG. 5 illustrates a screen display 500 that a maintenance and repair technician may use during the repair process 222. At step 224, the maintenance and repair technician responds to the service call. The technician may respond to the physical location of the failed production equipment or may alternatively evaluate information regarding the service call and the failed equipment from a remote location. In either case, at step 402 the maintenance and repair technician initiates the maintenance coordination software on a terminal.

Upon entering certain information about the service call, the technician may view a screen display such as that pictured in FIG. 5 as 500. The screen display 500 may include a number of data fields such as the problem code field 502, which includes a drop down menu 504. The problem code data field may have been completed previously by the equipment operator; however, it may be necessary or helpful for the maintenance and repair technician to update the problem code. Additionally, the screen display 500 may include a repair code data field and associated drop down menu 508 having listed a number of repair codes 506 relating to the failed equipment. In one embodiment of the present invention, it may be helpful for the maintenance and repair technician to enter a repair code and transmit the updated information to the database server, which will allow other repair technicians to see that someone has responded to the call and generally determined the nature, of the call.

If helpful to the repair effort, the maintenance and repair technician may perform any of several functions in the maintenance coordination system. For example, the technician may view the maintenance and repair history of the equipment by initiating the check equipment history process 404. This process will be explained in more detail hereinafter; however, in brief, the process 404 may be used to determine what, if any, repairs were previously necessary on the failed equipment. The technician may additionally use this process to evaluate for example, the equipment specifications in order to better prepare for the service call. The technician may initiate the check equipment history process 404 by selecting an electronic button such as the check history button 510 of FIG. 5.

Additionally or alternatively, the maintenance and repair technician may wish to evaluate the failed equipment at the component level. The technician may do so by initiating the check component history process at step 406. The check component history process 406 will also be explained in more detail hereinafter. However, the process operates similarly to the check equipment history process 404.

Additionally or alternatively, the maintenance and repair technician may initiate the repair of the equipment at step 408.

Figure 6:
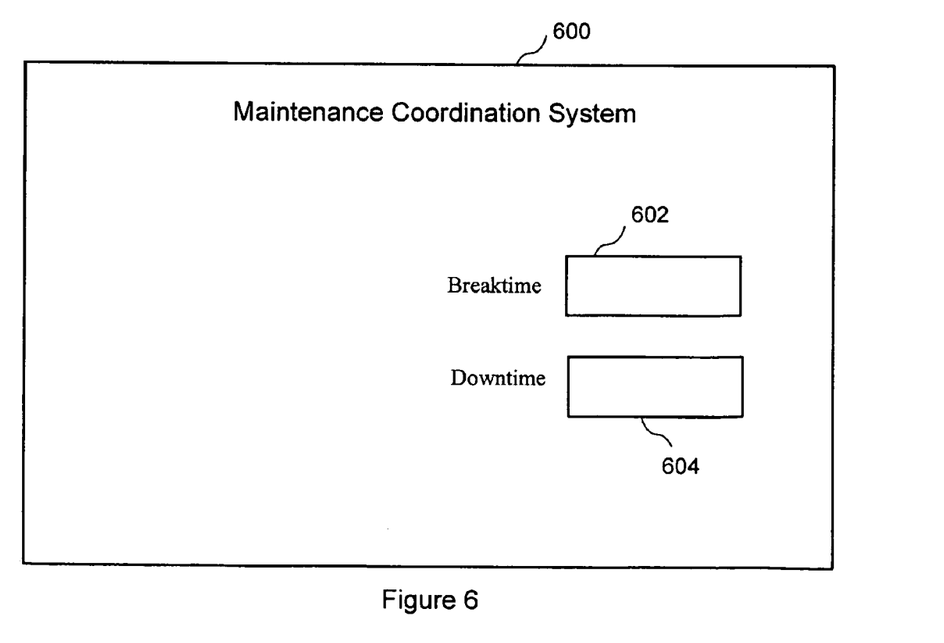
FIG. 6 is a third screen display that may be used in the maintenance coordination system of FIG. 2.

Attention is now directed to FIG. 4 in combination with FIG. 6. During the repair effort or upon its completion, as indicated by step 410, the maintenance and repair technician may enter information into the maintenance coordination system using a screen display such as screen display 600. The screen display includes a number of data fields relating to the repair effort. The repair effort may include several steps in addition to actually completing the physical repair effort. For example, the repair effort may include running a test batch at step 412 to evaluate the condition of the repaired equipment. It may also be the case that the repair technician takes a break from the repair effort at step 414. As mentioned previously, the time to repair and the number of items processed during the repair may be important information in determining costs to a customer. Therefore, screen display 600 includes data fields 602, 604 that assist in keeping track of these variables. For instance, the technician can enter the amount of time spent taking breaks during the repair into the appropriate data field 602. Alternatively, the break time may be calculated automatically by having the technician log in and out during the repair, for example. The technician may also enter the amount of time spent testing the equipment into the data field 604.

Returning to FIG. 4, once the equipment is repaired and the appropriate data entered, the technician may transmit the data to the database server at step 416. The technician may then exit the maintenance coordination software at step 418.

Figure 7:
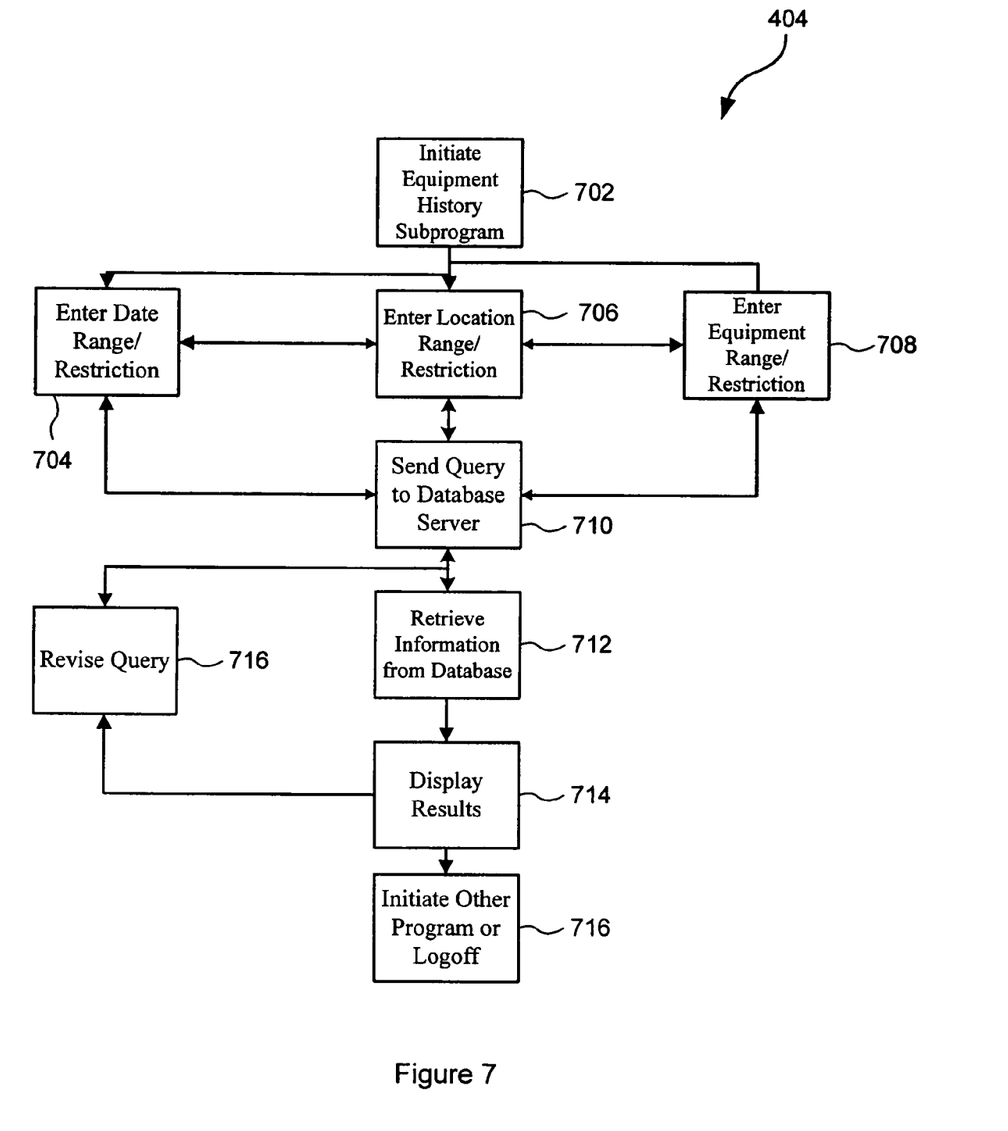
FIG. 7 is a flow diagram of a portion of the maintenance coordination system of FIG. 4 in greater detail.

Attention is now directed to FIG. 7, which illustrates the check equipment history process 404 (FIG. 4) in greater detail. The maintenance technician, or other user, initiates the equipment history process at step 702. It should be noted that this process also may be available to other users of the maintenance coordination software. The user may enter a number of different variables depending on the equipment whose history the user wishes to review. For example, at step 704, the user may enter a date range restriction to review only repair history during a specific date range. At step 706, the user may enter a location range restriction to review only repairs that took place at a particular location or locations. At step 708, the user may enter equipment range restrictions to review history only on particular pieces of equipment. Once the user has compiled all the restrictions desired, the user would send the query to the database server where historical maintenance data is stored.

The information is retrieved from the database at step 712 and the results are displayed at step 714 on the terminal being used by the user. Depending on the results, the user may wish to revise the query at step 716 or initiate other processes such as the check component history process.

A screen display for operating the check equipment history process 404 may conveniently be used in a manner similar to that previously described. The check component history process 406 operates in a similar fashion to the check equipment history process 404, except that the check component history process operates on individual equipment components. In certain repair operations equipment components may be moved from one piece of equipment to a similar piece of equipment. Therefore, an ability to review the history of a component is also desirable.

Figure 8:
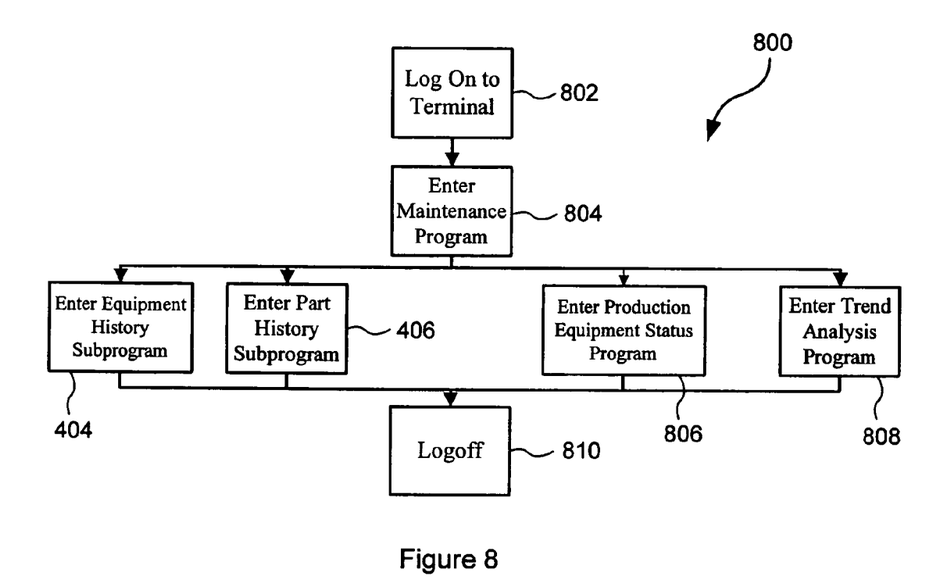
FIG. 8 is a flow diagram of a maintenance coordination system according to a second embodiment of the present invention that may be implemented in the networked production environment of FIG. 1.

Use of the maintenance coordination system is not limited to equipment operators, maintenance technicians and maintenance supervisors. Other employees of the business may have needs to access the information compiled by the maintenance coordination system. Attention is directed to FIG. 8, which illustrates a process 800 that may be carried out on a terminal such as terminal 132 associated with a remote business location 117 (FIG. 1). The user logs on to the terminal at step 802 and executes the maintenance coordination software at step 804. From there the user may enter the previously described check equipment history process 404 or check component history process 406. Alternatively, the user may enter a production equipment status process 806 or a trend analysis process 808, among other options.

Figure 9:
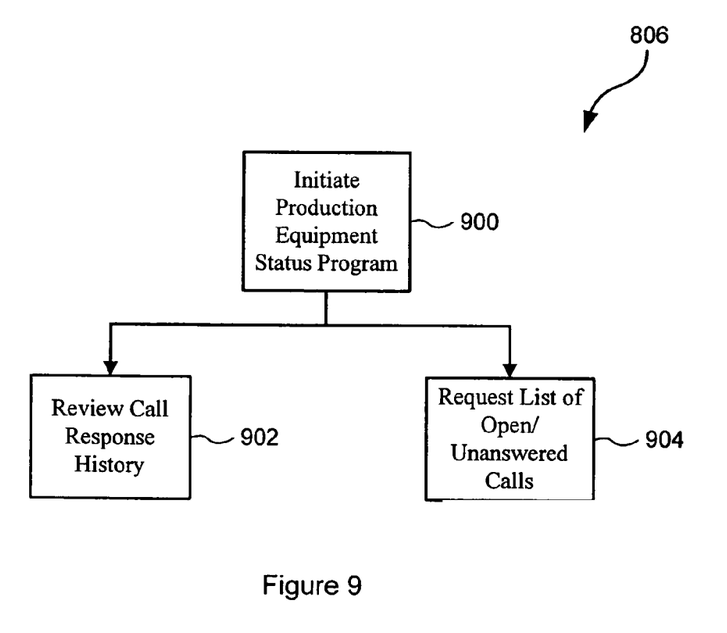
FIG. 9 is a flow diagram of a portion of the maintenance coordination system of FIG. 8 in greater detail.

Attention is directed toward FIG. 9, which illustrates the production equipment status process 806 in greater detail. Upon initiation of the production equipment status process at step 900, the user encounters at least two options. At step 7902, the user may review the call response history, which may tell the user, for example, historically how long it takes for a maintenance technician to respond to a service call, how much time a particular technician spends on breaks while repairing equipment, how much time is spent testing equipment during a service call, and the amount of time it takes for a service call to be completed. Such information may assist maintenance supervisors and engineers to design better equipment or more efficient production environments. At step 904 the user may also request a list of open or unanswered service calls to find out the current status of the production environment.

Returning to FIG. 8, a user at a remote business location or any location within the network, may enter a trend analysis program at step 808. The trend analysis program may be used in a predictive maintenance environment to analyze trends of equipment failures over time by location, type of equipment, type of component that failed or other parameters particular to the type of production equipment used in the production environment. The ability to analyze trends and predict maintenance is enabled by the compilation of historical data relating to ongoing maintenance activities of the production equipment. The trend analysis and predictive maintenance features of the present invention are described further with respect to FIG. 10.

Figure 10:
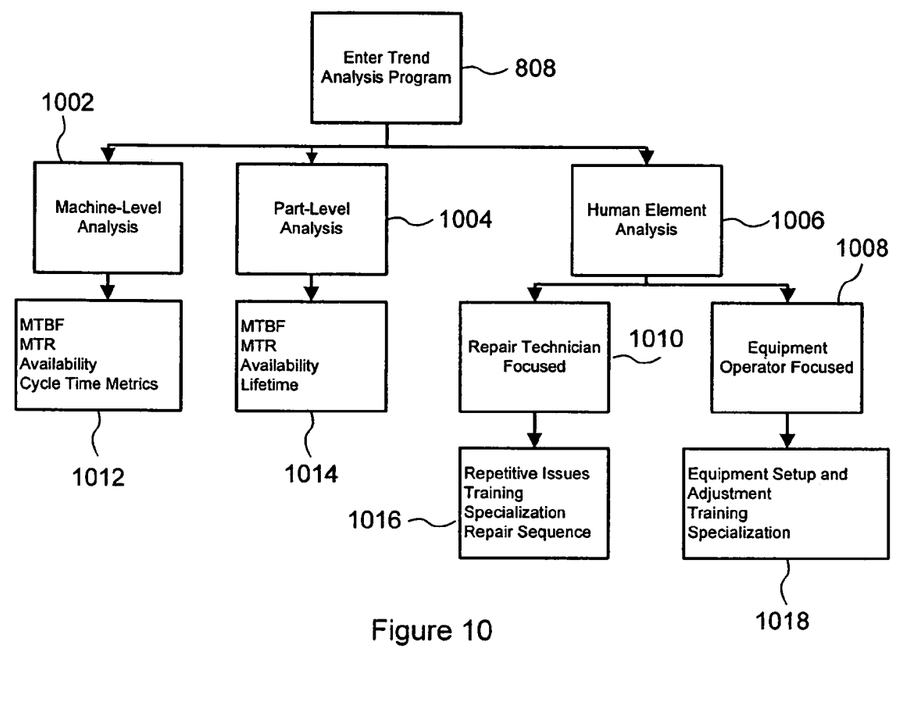
FIG. 10 is a flow diagram of the trend analysis program according to embodiments of the present invention.

FIG. 10 illustrates the trend analysis program in greater detail. The trend analysis program is entered at step 808, as described above. According to some embodiments of the present invention, the program may be executed from a computing device, such as any of the terminals 132. In this non-limiting example, the trend analysis program may provide a user with a number of options for analyzing the historical data. For example, a user may initiate machine-level analysis at operation 1002, initiate part-level analysis at operation 1004, or initiate human element analysis at operation 1006. Further, human element analysis may include analysis focused on equipment operators at operation 1008, or analysis focused on repair technicians at operation 1010. Each of these sub-programs will be described in more detail immediately hereinafter.

A number of different trend and predictive maintenance analyses may be performed at the machine level using historical maintenance data, as indicated by operation 1012. For example, using the historical maintenance data, Mean Time Between Failure (MTBF) and Mean Time to Recover (MTR) metrics may be calculated. MTBF and MTR are well known terms in the reliability and maintainability arts. They determine an average time between failures of a machine or piece of equipment and the average time to restore the machine or piece of equipment to operational status. The calculations may be performed on individual pieces or equipment, classes of similar equipment, and/or all equipment in inventory or in a particular location. MTBF and MTR may be used to schedule preventative maintenance procedures, route production activities, recall particularly troubling parts, and determine maintenance staff requirements.

The trend analysis program also may be used to determine the "availability" of classes of production equipment. Availability measures the percentage of time a piece of equipment is functioning properly versus inoperable. Availability is useful in determining the number of pieces of a particular kind of equipment required in inventory to satisfy production demands.

Using the historical maintenance data together with production cycle information provides the basis for calculating any of the above metrics based on actual production time versus calendar time. For example, MTBF based on calendar time for a seldom used piece of equipment has a different meaning than an equal MTBF based on calendar time for an often used piece of equipment. Thus, it is helpful and more meaningful to use total run time for equipment than total elapsed calendar time to track failures and schedule preventive maintenance. Therefore, in some embodiments of the present invention, equipment run time for production equipment is logged and included in the trend analysis calculations.

As indicated at operation 1014, a number of reliability metrics may be performed at both the part and the component level using the historical data. For example, in addition to MTBF and MTR, "lifetime" for a part may be calculated. Lifetime measures the average operational life span for a part before the part must be replaced. MTBF and MTR both help to schedule preventive maintenance, while all three, particularly lifetime, aid in the determination of inventory levels for spare parts. As with machine-level metrics, part-level metrics may be based on either total elapsed calendar time, or the more meaningful equipment cycle time.

In addition to machine- and part-level metrics, the historical data may be used to evaluate human element maintenance and reliability issues. For example, as indicated by operation 1016, a number of metrics may be determined to evaluate the performance of repair technicians. Quantitative metrics, such as repair time, may be used to assess the performance of individual repair technicians, the maintenance force in total, or any particular group of repair technicians. Repair time may be evaluated by type of repair, as well, to assess whether additional individual or group training is needed. However, tracking the performance of repair technicians also may require a different type of analysis than that required for evaluating hardware performance using, for example, MTBF and MTR. Qualitative analyses may be used to determine if an individual repair technician creates maintenance issues. For example, if a particular type of failure routinely follows a maintenance event by an individual repair technician, then the technician in question may not be following correct procedures. Such occurrences may be evident only in light of a qualitative analysis of available data.

The historical data also may be used to determine if repair technicians are following an efficient sequence in responding to maintenance requests. It may be the case that particular types of failures are routinely being given lower priority. This could evidence a need for specialization with respect to particular types of failures. Many other types of both qualitative and quantitative analyses are possible relating to repair technicians.

Human element analyses also may be performed relating to equipment operators. Operation 1018 lists several types of metrics that relate to operators. For example, recurring problems at a particular operator's machine may indicate a lack of knowledge or experience relating to, for example, equipment setup, adjustment, and/or operation. This connection between an equipment operator and a reoccurring failure may become evident only under thorough analysis accomplished according to embodiments of the present invention. Thus, the historical maintenance data may be used to determine training and/or specialization requirements for equipment operators. Other examples are possible.

Historical data also may be used to suggest repairs to equipment operators. Thus, rather than alerting a repair technician initially, an equipment operator may be supplied with suggested corrective measures, including graphical representations of where the corrective measure should be applied. This may reduce the need for repair technicians to respond to service calls.

The specific activities carried out within the maintenance coordination system and discussed above should not be considered exhaustive. Other activities are possible and in light of the disclosure herein, apparent to those of skill in the art. For example, although the system has been described as having maintenance coordination software residing on terminals at each production equipment location, this is not required. The process may be carried out in, for example, a client-server, wherein the maintenance coordination software resides on a server at a central location, without departing from the spirit and scope of the invention. Therefore, the foregoing description should not be considered limiting, but the invention should be broadly interpreted in view of the following claims.

What is claimed is:

1. A system for coordinating the maintenance of a plurality of machines, comprising:
   a computer terminal associated with each of the plurality of machines, wherein each computer terminal is configured to receive data relating to the condition of one of the machines;
   a host computer configured to receive and store the data on the condition of the machine from a computer terminal, wherein the host computer is configured to transmit an alert upon the receipt of data that indicates that one of the machines requires maintenance, wherein the alert is configured to initiate a process to alter the condition of the machine; and
   a predictive maintenance computer programmed to receive and analyze the data and provide predictive maintenance information;
   wherein the predictive maintenance computer is further configured to analyze historical data relating to a specific machine, in response to detecting an alert that the specific machine requires repair, to thereby determine a suggested corrective measure for the specific machine and wherein the host computer is configured to return the suggested corrective measure to a computer terminal associated with the specific machine.

2. The system of claim 1, wherein the predictive maintenance computer is programmed to determine a mean time between failures for a machine.

3. The system of claim 1, wherein the predictive maintenance computer is programmed to determine a mean time to recover for a machine.

4. The system of claim 1, wherein the predictive maintenance computer is programmed to determine an availability for a machine.

5. The system of claim 1, wherein the predictive maintenance computer is programmed to determine a predicted lifetime for a component of a machine.

6. The system of claim 1, wherein the predictive maintenance computer is programmed to determine an average repair time for a machine.

7. A method of coordinating the maintenance of a plurality of machines, comprising:
monitoring each of the plurality of machines;
compiling, over time, historical maintenance and repair information for the plurality of machines;
detecting a failure of at least one of the machines;
entering data relating to the condition of the failed machine into a computer terminal associated with the failed machine;
transmitting the data to a host computer system;
transmitting an alert from the host computer system upon the receipt of data that indicates that one of the machines requires maintenance, thereby initiating a process to alter the condition of the failed machine;
storing the data at the host computer system;
in response to the alert, analyzing the data and the historical maintenance and repair information relating to the failed machine to develop a suggested corrective measure; and
responding to a request for assistance by providing the suggested corrective measure to a computer terminal associated with the failed machine.

8. The method of claim 7, wherein analyzing the data includes calculating a mean time between failures for a machine.

9. The method of claim 7, wherein analyzing the data includes calculating a mean time to recover for a machine.

10. The method of claim 7, wherein analyzing the data includes calculating an availability for a machine.

11. The method of claim 7, wherein analyzing the data includes calculating a predicted lifetime for a component of a machine.

12. The method of claim 7, wherein analyzing the data includes calculating an average repair time for a machine.

13. The method of claim 7, further comprising using the predictive maintenance information to schedule machines for maintenance.

14. The method of claim 7, further comprising using the predictive maintenance information to determine machine operator training requirements.

* * * * *